（12）United States Patent
Hentschel et al.

(10) Patent No.: US 7,588,006 B2
(45) Date of Patent: Sep. 15, 2009

(54) BEARING BETWEEN TWO COAXIAL CAMSHAFTS FOR AUTOMOTIVE ENGINES IN PARTICULAR

(75) Inventors: Tilo Hentschel, Albershausen (DE); Martin Lechner, Lindlar/Frielingsdorf (DE); Falk Schneider, Münchingen (DE)

(73) Assignee: Mahle Ventiltrieb GmbH, Stuttgart (DE)

( * ) Notice: Subject to any disclaimer, the term of this patent is extended or adjusted under 35 U.S.C. 154(b) by 318 days.

(21) Appl. No.: 11/628,170

(22) PCT Filed: Oct. 21, 2005

(86) PCT No.: PCT/DE2005/001888

§ 371 (c)(1),
(2), (4) Date: Nov. 30, 2006

(87) PCT Pub. No.: WO2006/050686

PCT Pub. Date: May 18, 2006

(65) Prior Publication Data

US 2007/0245990 A1 Oct. 25, 2007

(30) Foreign Application Priority Data

Nov. 9, 2004 (DE) .................. 10 2004 054 301

(51) Int. Cl.
*F01L 1/04* (2006.01)
(52) U.S. Cl. .................. 123/90.6; 123/90.44; 29/888.1
(58) Field of Classification Search .............. 123/90.16, 123/90.2, 90.27, 90.31, 90.44, 90.6; 29/888.1
See application file for complete search history.

(56) References Cited

U.S. PATENT DOCUMENTS

| 6,725,817 | B2 | 4/2004 | Methley et al. |
| 6,725,818 | B2 * | 4/2004 | Methley .................. 123/90.27 |
| 2002/0170514 | A1 | 11/2002 | Methley |

FOREIGN PATENT DOCUMENTS

| DE | 36 24 827 A1 | 2/1988 |
| DE | 42 26 798 A1 | 2/1994 |
| DE | 93 20 451 U1 | 10/1994 |
| EP | 0 254 058 A | 1/1988 |
| EP | 1 234 954 A | 8/2002 |
| FR | 2 843 997 A | 3/2004 |

OTHER PUBLICATIONS

International Search Report.

* cited by examiner

*Primary Examiner*—Ching Chang
(74) *Attorney, Agent, or Firm*—Collard & Roe, P.C.

(57) ABSTRACT

A camshaft for automotive engines in particular having contra-rotating cams capable of rotating over a limited circumferential angle about the camshaft axis in which
an inside shaft (2) and an outside shaft (1) are arranged concentrically one inside the other,
the contra-rotating cams (3, 4) include first and second cams, of which the first cam (4) is fixedly connected to the inside shaft, and the second cam (3) is fixedly connected to the outside shaft (1),
the outside shaft (1) and the inside shaft (2) are mounted with respect to one another,
is to be manufacturable economically and with a high manufacturing precision.

15 Claims, 2 Drawing Sheets

BEARING BETWEEN TWO COAXIAL CAMSHAFTS FOR AUTOMOTIVE ENGINES IN PARTICULAR

CROSS REFERENCE TO RELATED APPLICATIONS

Figure 1:
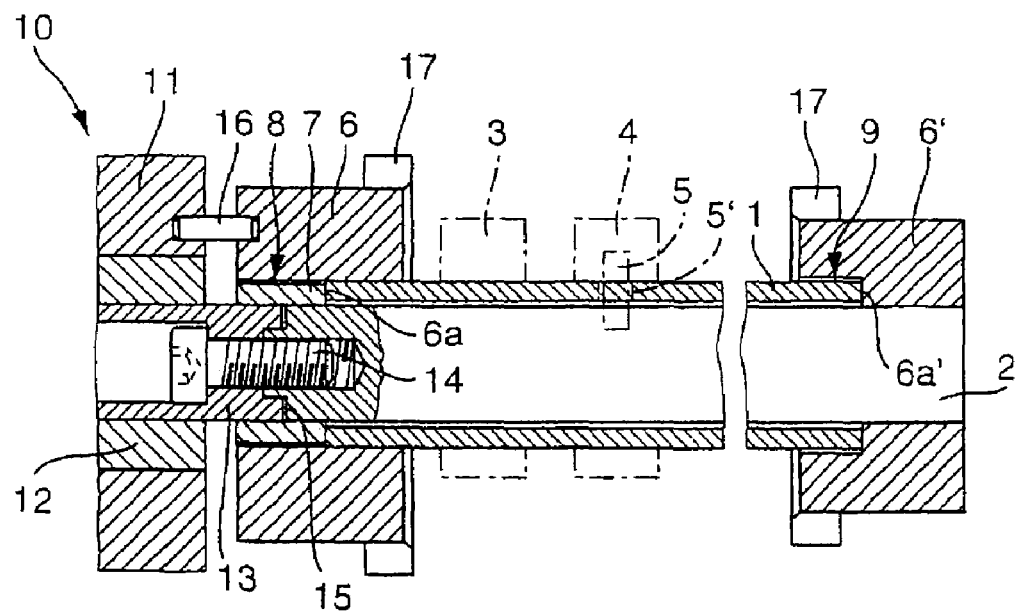

Applicants claim priority under 35 U.S.C. §119 of German Application No. 10 2004 054 301.1 filed Nov. 9, 2004. Applicants also claim priority under 35 U.S.C. §365 of PCT/DE2005/001888 filed Oct. 21, 2005. The international application under PCT article 21(2) was not published in English.

The invention relates to a camshaft for automotive engines, in particular with contra-rotating cams rotatable over limited circumferential angles about the camshaft axis. Such camshafts are known as adjustable and/or phase-adjustable camshafts which permit a variation in the control times of the gas exchange valves in an internal combustion engine.

The invention relates to the object of being able to manufacture such a camshaft economically and with a high manufacturing precision.

This object is achieved primarily by a camshaft having the characterizing features of the invention.

Advantageous and expedient embodiments are the object of the invention.

The invention is based on the general idea of being able to manufacture the inside and outside shafts so that each is free of shoulders axially. If add-on elements are to be attached to the inside shaft or the outside shaft, in particular the outside shaft, for the purpose of joining the inside and outside shafts, then after the respective joining, no afterworking on the connected parts should be necessary. Instead, it should be possible to assemble the camshaft from individual parts that have already been completely machined, namely including a drive element that is to be attached to the camshaft.

Axial fixation between the inside and outside shafts can be achieved easily through the add-on elements to be attached to the inside shaft at one end. Such fixation is achieved in a particularly simple manner by designing the outside shaft to be shorter than the inside shaft, so that the first add-on elements which have an axially securing effect can be joined to the ends of the inside shaft by pressing, shrinking or alternative methods. To be joinable in this form, the respective first add-on elements are designed to be ring-shaped in particular.

The add-on elements may be designed to be practically identical at the two ends of the camshafts by providing a pair of add-on elements consisting of a first add-on element which is fixedly connected to the inside shaft and a second add-on element which is fixedly connected to the outside shaft.

However, in especially advantageous embodiment, a pair of add-on elements consisting of a first and a second add-on element is required only on the drive end of the camshaft, while on the other end of the camshaft only a first add-on element to be fixedly attached to the inside shaft is required.

On the drive end of the camshaft, the first add-on element is advantageously designed to protrude axially beyond the respective end of the inside shaft. Due to such a ring-shaped protrusion, it is possible to center the driveshaft of a drive element that is to be connected to the inside shaft and to center it radially in this ring area.

A driveshaft of a drive element to be connected to the inside shaft may be connected in a friction-locked manner to the inside shaft via a head screw passing axially through the driveshaft. For a preselectable angle of rotation allocation between the driveshaft of a drive element and the inside shaft in particular, a radially aligned tongue-and-groove connection may be provided in the mutual end-face connecting area.

However, it is also possible to achieve the angle of rotation allocation via an alignment pin that runs along and parallel to the camshaft axis and engages in the components that are to be joined together.

Therefore, to be able to adjust the angle of rotation between the inside shaft and the outside shaft, the drive element is equipped with known adjusting means. The part of the drive element having an adjustable angle of rotation in comparison with the driveshaft due to these known adjusting means can be connected in a rotationally fixed manner to a second add-on part via an alignment pin running parallel to the camshaft axis. The alignment pin engages in opposing boreholes in the drive element on the one hand and the second drive element on the other hand.

In the case of a camshaft design in which there is a pair of add-on elements consisting of a first and a second add-on element at one end of the camshaft, and only one first add-on element is provided at the second end, where it is fixedly attached to the inside shaft, then the mutual angle-of-rotation position between the inside the shaft and the outside shaft can be measured easily and optionally used to control the adjustment of the angle of rotation between the inside shaft and the outside shaft by means of the measurement instruments mounted on the second add-on element at one end and the first add-on element at the other end on opposite ends of the camshaft.

Advantageous exemplary embodiments are explained in greater detail below and diagrammed schematically in the drawing.

Figure 2:
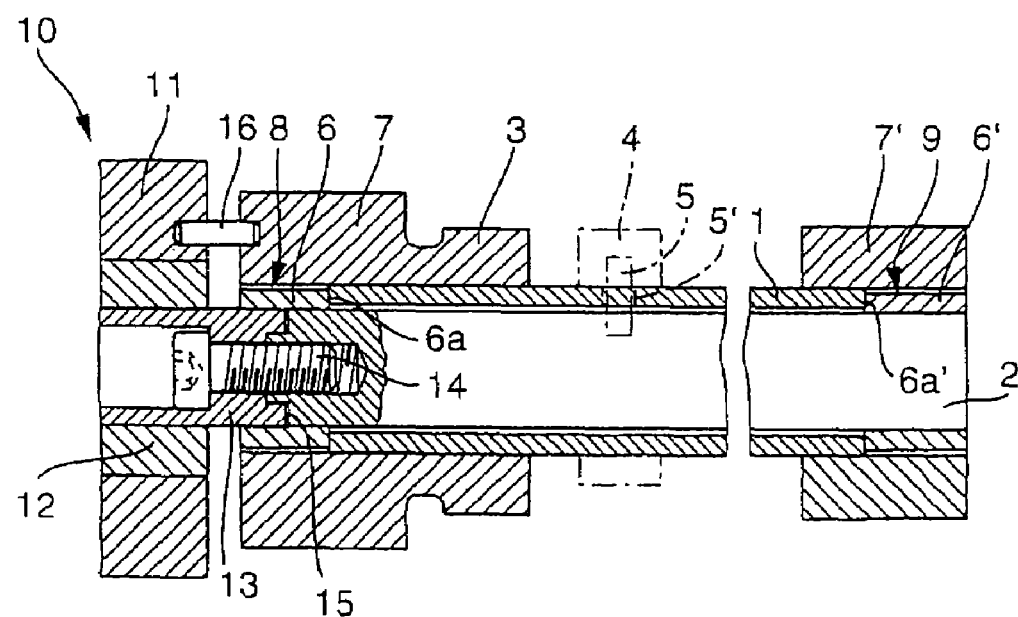
Figure 3:
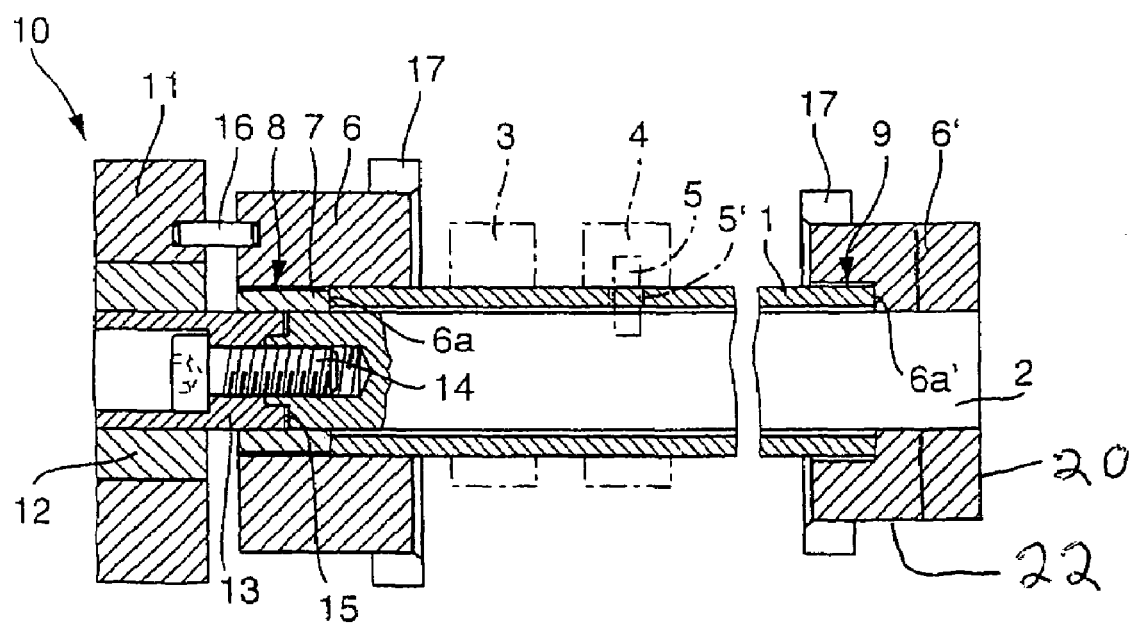

The drawing shows:

FIG. 1 a longitudinal section through a camshaft with a connected drive element, FIG. 2 a longitudinal section through a camshaft with a connected drive element in an alternative embodiment; and FIG. 3 a longitudinal section through a camshaft with a connected drive element in an additional embodiment.

An adjustable camshaft of an automotive engine in which the angle-of-rotation position of the cams can be varied mutually in a known way to obtain different control times for the gas exchange valves that are to be controlled has an outside shaft 1 and an inside shaft arranged concentrically inside the outside shaft. These two shafts 1 and 2 are mounted to allow contra-rotation, as explained in greater detail below.

To achieve a mutual adjustment of the angle of rotation of the cams, two of which, i.e., cams 3 and 4, are indicated schematically as examples in the drawing, these cams are not connected to the same shaft 1, 2. In the case of two cams such as cams 3 and 4, whose angles of rotation are variable with respect to one another, the cam 3 is fixedly connected to the outside shaft 1 and the cam 4 is fixedly connected to the inside shaft 2 via a pin 5. The pin 5 passes through a recess 5 in the outside shaft 1 running like an elongated hole in the circumferential direction. The cam 4 which is fixedly connected to the inside shaft 2 can slide on the outside shaft 1, i.e., the cam 4 is guided on the outside shaft 1. When the cams 1 and 2 are contra-rotating, the two cams 3 and 4 experience a corresponding change in angle of rotation in relation to one another, which is also referred to in practice as a phase adjustment.

The outside shaft 1 is designed as a cylindrical pipe having uniformly the same inside diameter and outside diameter. The inside shaft 2 in the example shown here is made of a solid material and has a cylindrical outer jacket with a diameter that is uniform over the entire length. As an alternative, the inside shaft 2 may also be designed as a cylindrical tube having the same diameters at all points.

The mutual bearing of the outside shaft 1 and the inside shaft 2 and the axial attachment of these two shafts 1, 2 with respect to one another are explained as follows in the case of the example illustrated in FIG. 1.

A cylindrical ring is joined as a first add-on element 6 to the left end of the inside shaft 2. This ring-shaped add-on element 6 protrudes axially beyond the respective end of the inside shaft 2. Another ring-shaped add-on element 6' is joined to the right end of the inside shaft 2. The outside shaft 1 is secured axially with respect to the inside shaft 2 by the two end faces 6a, 6a' of these first add-on elements 6, 6' which are joined to the inside shaft 2, said end faces acting as axial bearings. On the left end of the outside shaft 1 a second add-on element 7 in the form of a ring which protrudes axially outward is shrunk axially onto the left end of the outside shaft. The inside shaft 2 is supported with respect to the outside shaft 1 in two bearing areas 8 and 9. The bearing area 8 is formed by the first and second add-on elements 6, 7. The second bearing area 9 is between an outer jacket area of the outside shaft 1 and the first add-on element 6' which is mounted on the right end of the shaft 2. There is no bearing of the outside shaft 1 directly on the inside shaft 2, i.e., there is preferably some play between the outside shaft 1 and the inside shaft 2. Therefore, the entire lateral surface on the inside of the outside shaft can be manufactured without function and is easy to manufacture in the technical fabrication sense. The bearing and securing elements described above for mutual support and securing of the outside shaft 1 and the inside shaft 2 yield the advantage that the camshaft can be assembled completely from simple parts that have already been machined completely, so that no afterworking is necessary on the completed camshaft. Likewise, adjustment processes may be omitted. The joints between the add-on elements 6, 6' and 7 on the one hand and the respective shafts 1, 2 on the other hand can be manufactured extremely inexpensively, preferably as a shrink-fit joint or as a press-fit joint.

A drive element 10 acts on the camshaft. The drive element 10 is assembled in a known way such that an area 11 that is on the outside radially is adjustable in its angle of rotation with respect to a central area 12. The central area 12 has a driveshaft 13 protruding axially outward with a cylindrical outside diameter. This driveshaft 13 connected in a friction-locked manner to the left end face of the inside shaft via a head screw 14, whereby the thread of the head screw 14 is screwed into the shaft 2. The driveshaft 13 is radially centered with respect to the inside shaft 2 by the ring-shaped first add-on element 6 protruding axially from the inside shaft.

For a preselectable angle-of-rotation position of the driveshaft 13 with respect to the inside shaft 2, a tongue-and-groove connection 15 having a radial extent is provided in the stop area between the driveshaft 13 and the inside shaft 2. Instead of such a tongue-and-groove connection, an alignment pin running parallel to the camshaft axis may also be provided, engaging in respective fitted boreholes in the parts that are joined together, namely the driveshaft 13 on the one hand and the inside shaft 2 on the other hand.

The area 11 of the drive element 10 on the outside radially is connected in a fixed angle of rotation to the second add-on element 7 via an alignment pin 16. This alignment pin 16 engages with an accurate fit in respective boreholes in the area 11 of the drive element 10 on the outside radially on the one hand and in the second add-on element 17 on the other hand.

Since the add-on elements 6', 7' are positioned axially in opposition such that the second add-on element 17 is connected to the outside shaft 1 on the one hand, while the first add-on element 6' is connected to the inside shaft 2 on the other hand, so measurement instruments 17 mounted on these two add-on elements 7, 6' can easily measure the relative angle of rotation adjustment between the outside shaft 1 and the inside shaft 2. These measured values may be used to control the camshaft adjustment or to control the angle of rotation adjustment. Any essentially known measurement instruments with which it is possible to detect changes in angle of rotation can be used here.

FIG. 2 shows an alternative embodiment of the bearing of the inside shaft 2 with respect to the outside shaft 1. This differs from the first embodiment according to FIG. 1 primarily in the type of mutual bearing of the outside shaft 1 and the inside shaft 2 on the ends of these shafts 1, 2 at a distance from the drive element 10. The alternative bearing with a first drive element 6' and a respective second drive element 7' corresponds here practically to that implemented in the embodiment according to FIG. 1 on the ends of the shafts 1, 2 facing the drive element 10. As an additional difference, the second add-on element 7 which is adjacent to the drive element 10 is designed in one piece with a cam 3 joined fixedly to the outside shaft 1.

FIG. 3 shows an additional embodiment of the camshaft wherein the first add-on element 6' cooperating with the outside lateral surface of the outside shaft 1 is a module consisting of two components 20, 22 without shoulders on the inside lateral surfaces and is jointly connected to the inside shaft 2.

All the features depicted in the description and in the following claims may be essential to the invention either individually or combined in any form.

The invention claimed is:

1. A camshaft for automotive engines, having contra-rotating cams rotating about the camshaft axis over limited circumferential angles, wherein
   an inside shaft (2) and an outside shaft (1) are arranged concentrically one inside the other,
   the contra-rotating cams (3, 4) consist of first and second cams, the first cam (4) of which is fixedly joined to the inside shaft (2) and the second cam (3) of which is fixedly attached to the outside shaft (1),
   the outside shaft (1) and the inside shaft (2) are mounted with respect to one another
   comprising the features
   the inside shaft (2) has a greater length than the outside shaft (1),
   the axial attachment between the outside shaft (1) and the inside shaft (2) provided via first add-on elements (6, 6') that are fixedly joined to the ends of the inside shaft (2),
   the first add-on elements (6, 6') have cylindrical bearing face areas (8, 9),
   the cylindrical bearing face areas (8, 9) of the first add-on elements (6, 6') are designed as bearing faces (8, 9) for the bearing of the inside shaft (2) with respect to the outside shaft (1).

2. The camshaft according to claim 1, wherein thrust bearing surfaces (8, 9) of the outside shaft (1) assigned to the cylindrical bearing face areas (8, 9) of the inside shaft (2) are situated on second add-on elements (7, 7') that are fixedly connected to the outside shaft.

3. The camshaft according to claim 1, wherein the connections of the first and second add-on elements (6, 6'; 7, 7') to the inside shaft (2) or the outside shaft (1) are designed as press fit connections or as shrink fit connections.

4. The camshaft according to claim 1, wherein the radial bearing between the outside shaft (1) and the inside shaft (2) is provided by the cooperation of
   a first add-on part (6) with a second add-on part (7) at one end and a first add-on part (6') with an area of the outer lateral surface of the outside shaft (1) at the other end.

5. The camshaft according to claim 4, wherein the first add-on element (6') which is fixedly connected to the inside shaft (2) and the second add-on element (7) which is fixedly connected to the outside shaft (1) are each provided with measurement instruments (17) for detecting the mutual angle of rotation settings of these add-on elements (6', 7).

6. Camshaft according to claim 4, wherein the first add-on element (6') cooperating with the outside lateral surface of the outside shaft (1) is designed as a module or in one piece to at least one cam (4) and is designed jointly to the inside shaft (2).

7. The camshaft according to claim 4, wherein the first add-on element (6') cooperating with the outside lateral surface of the outside shaft (1) is a module consisting of two components (20,22) without shoulders on the inside lateral surfaces and is jointly connected to the inside shaft (2).

8. The camshaft according to claim 1, wherein the outside shaft (1) and the inside shaft (2) have outside and/or inside lateral surfaces, whereas at least one of these surfaces is continuous and without shoulders.

9. The camshaft according to claim 1, wherein a first add-on element (6) mounted on one end of the camshaft is designed as a ring protruding axially to the outside beyond a respective end of the inside shaft (2) with inside and outside lateral surfaces each in a cylindrical form.

10. The camshaft according to claim 9 with a drive element (10) that can be connected separately to the outside shaft (1) and the inside shaft (2), comprising the features
 a driveshaft (13) protrudes away from the drive element (10), whereby this driveshaft (13)
 is connected in a form-fitting or friction-locked manner to the inside shaft (2) and
 is centered in a partial axial area of its outside circumference via a radial fit within the area of the first add-on element (6) protruding axially away from the inside shaft (2).

11. The camshaft according to claim 1, wherein the connecting means between the driveshaft (13) and the inside shaft (2) include a tongue-and-groove connection (15) running radially on the end.

12. The camshaft according to claim 1, wherein the connecting means between the driveshaft (13) and the inside shaft (2) include at least one alignment pin that runs parallel to the camshaft and engages in a fitted bore in opposing ends of the driveshaft (13) and the inside shaft (2).

13. The camshaft according to claim 1, wherein the connecting means between the driveshaft (13) and the inside shaft (2) include a head screw (14) with which a free end face of the driveshaft (13) is pressed in a friction-locked manner against a respective end face of the inside shaft (2) in the axial direction of the camshaft.

14. The camshaft according to claim 1, wherein the connection of the drive element (10) to the outside shaft (1) is formed by at least one alignment pin (16) which engages in a form-fitting manner in opposing boreholes in the second add-on element (7) on the outside shaft (1) on the one hand and a radially outer area (11) of the drive element (10) on the other hand, whereby the drive element (10) is provided with means by which to adjust the angle of rotation between the outside shaft (1) and the inside shaft (2).

15. The camshaft according to claim 1, wherein at least one second add-on element (7, 7') is connected as a module or in one piece to at least one cam (3) and is attached jointly to the outside shaft (1).

* * * * *